(No Model.)

F. B. BADT.
AUTOMATIC TIME CUT-OUT.

No. 548,904. Patented Oct. 29, 1895.

Witnesses:
A. F. Reinke
Walter J. Gunthorp

Inventor.
Francis B. Badt
By Francis W. Parker,
Atty.

UNITED STATES PATENT OFFICE.

FRANCIS B. BADT, OF CHICAGO, ILLINOIS.

AUTOMATIC TIME CUT-OUT.

SPECIFICATION forming part of Letters Patent No. 548,904, dated October 29, 1895.

Application filed September 24, 1894. Serial No. 523,857. (No model.)

*To all whom it may concern:*

Be it known that I, FRANCIS B. BADT, a citizen of the United States, residing at Chicago, in the county of Cook and State of Illinois, have invented certain new and useful Improvements in Automatic Time Cut-Outs, of which the following is a specification.

My invention relates to time cut-outs for electric circuits.

The object of my invention is to produce a device by which an electric circuit that is only closed for short intervals—as, for example, the circuit of a galvanic battery—may be automatically broken after being closed for a predetermined length of time. Galvanic batteries are used quite extensively for domestic purposes, as for operating electric bells, electric gas-lighting systems, and the like. When used in this manner, the circuits of the batteries are only closed for a short period each time, and hence if the circuits remain in good condition the batteries will last for a long time without attention or renewal. If, on the other hand, the circuits become closed for any length of time, as is often the case, the batteries will run down and in most cases become entirely exhausted, so that a renewal is necessary before the bells or other translating devices can be operated. By the use of my device this short-circuiting of the batteries is entirely obviated.

Briefly stated, my invention, as here illustrated, consists in associating a device that is affected by changes in temperature with the circuit of the battery in such a manner that the heat developed by the current of the batteries will act, through the agency of such device, to complete a local circuit through an electromagnet or the like after the current has been flowing in the battery-circuit for a predetermined time, such electromagnet operating to break the circuit of the battery.

I will describe my invention more in detail by referring to the accompanying drawings, wherein—

Figure 1:
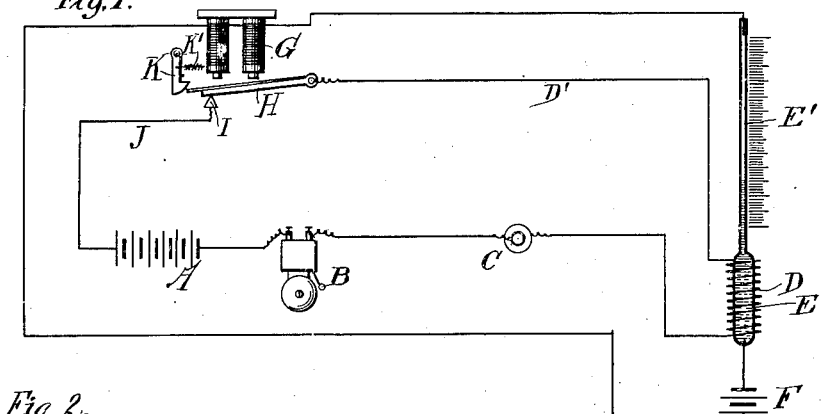
Figure 2:
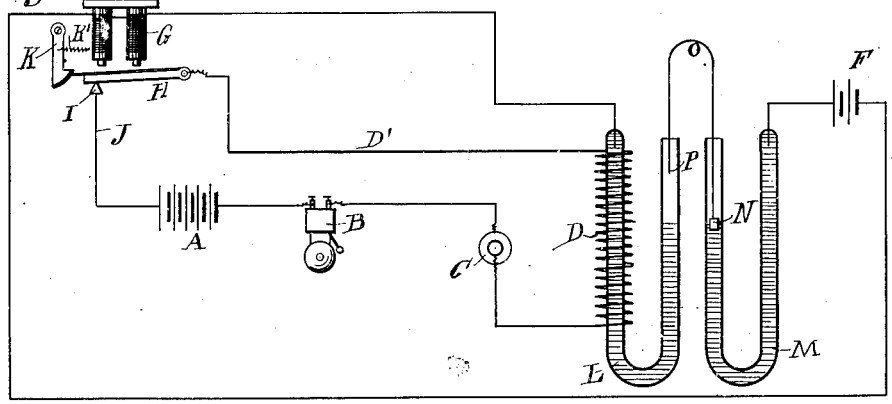
Figure 3:
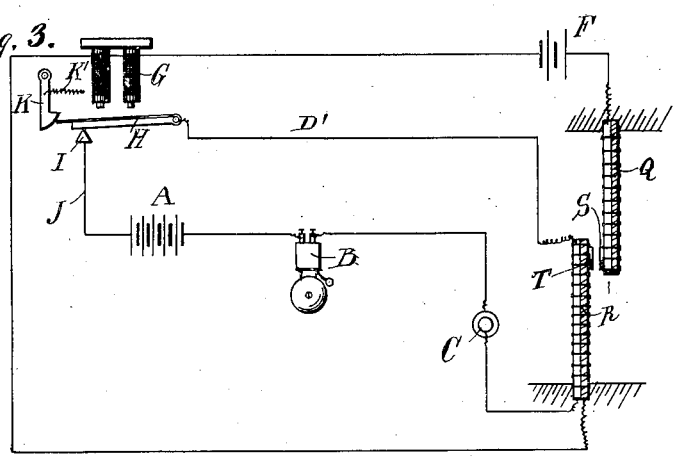

Figure 1 is a diagrammatic view of a bell-circuit embodying my invention. Fig. 2 is a similar view with a modified form of cut-out. Fig. 3 shows a second modification of the cut-out.

Like letters refer to like parts throughout the several figures.

Referring to Fig. 1, I have shown a circuit containing a battery A, a bell B, a push-button C, and a coil of wire D. The coil D is preferably of some material having a comparatively high resistance to the flow of the current, so that heat will be developed in such coil when the current passes through it. Placed within the coil D is a bulb E, containing mercury, and to which is attached the hollow stem E'. A local battery F has one terminal connected with the mercury in the bulb E, the other terminal being connected with one terminal of the electromagnet G. The other terminal of said electromagnet is connected with the opening in the stem E'. The coil D of the bell-circuit is connected by wire D' to armature H of the electromagnet G. Said armature is pivoted at one end and normally rests upon the contact I, which is connected by wire J to one electrode of the battery A. A pivoted hook K is provided with a retractile spring K' and is so situated that when the armature H is attracted by the magnet G said armature will be caught by the hook and held away from the contact I. When a bulb E and tube E' are used, it is evident that the length of time that must elapse before connection is made between the two wires at the ends of the bulb and tube, when the bell-circuit is closed, will depend upon the temperature of the air around said bulb and tube. When the air is warm, the mercury will be nearer the top of the tube, and hence will reach the wire sooner when heat is applied than when the air is cold. This difficulty is obviated by using the compensating devices shown in Figs. 2 and 3.

Fig. 2 shows an arrangement similiar to that of Fig. 1, with the exception that the bulb E and tube E' are replaced by the U-shaped tubes L and M. Each tube is closed at one end and is partially filled with mercury or the like, as shown. A float N is placed on the surface of the mercury in the tube M and has connected to it a conductor or wire O. Said wire is so shaped that its end P enters the open end of the tube L. The closed end of said tube is surrounded by the coil D. By this arrangement the distance between the surface of the mercury in the tube L and the point P of wire O will not be varied by changes of temperature of the surrounding air, as the mercury in each tube will be affected alike.

As shown in Fig. 3, I have substituted two ordinary thermostats Q and R for the mercury-tubes. These thermostats are made of two different metals that have a different coefficient of expansion. The distance between the contacts S and T is not varied by the temperature of the surrounding air, as said thermostats are arranged so as to be moved in the same direction by similar changes in temperature.

It is evident that these several parts may be varied in form, construction, and arrangement without departing from my invention, and I therefore do not wish to be limited to the construction and arrangement shown.

The mercury-tubes and thermostat are, in substance, no more than each a responsive device responding to an excessively prolonged flow of current, and the circuit-breaker is controlled by such responsive device. It is plain, therefore, that the responsive device which I have shown is simply one of many such as could be devised.

The use and operation of my invention are as follows: When the bell-circuit is open and in working condition, the armature H will rest upon the contact-point I. If now the bell-circuit should become closed for any reason, the current passing through coil D will heat the mercury in the tube E'. The expansion of the mercury causes it to rise in the tube E', and hence, unless the circuit is broken, the mercury will continue to rise until it reaches the wire at the upper end of the tube E' and completes the circuit of the battery F. When this circuit is completed, the magnet G is energized and attracts its armature H, so as to move it away from the contact I and break the bell-circuit. As the armature H moves toward the magnet G it pushes the hook K to one side, the hook being drawn back by the spring K' after the passage of the armature, so as to hold said armature in its new position. While the armature is in this retracted position the battery-circuit will remain open, but can again be placed in operative condition by moving the hook K, so as to free the armature and allow it to drop back on the contact I. If the battery-circuit should be short-circuited, the armature will again be drawn up, and the circuit must then be examined and the short circuit removed. When such a device as is shown in Fig. 1 is used, the distance between the surface of the mercury in tube E' and the wire in the end of said tube, and hence the time that must elapse before the closing of the local circuit, will vary with and depend upon the temperature of the air surrounding the bulb E. To obviate this difficulty and make the time of closing the local circuit practically constant and independent of the temperature of the air, I use a device like that shown in Figs. 2 or 3. The mercury in the two tubes L and M of Fig. 2 is affected equally by the temperature of the surrounding air, and hence the surface of the mercury in tube L will always be the same distance from the end P of the wire O so long as the tube L is not affected by the current in coil D, and hence the time that will elapse between the closing of the bell-circuit and the closing of the local circuit will depend in no way upon the temperature of the surrounding atmosphere. In Fig. 3 I have shown another way of accomplishing this result without the use of mercury. In this device the battery-current heats the thermostat R and causes it to move so as to bring the contacts S and T together. When this occurs, the local circuit is completed and the bell-circuit broken. I have shown a separate battery in the local circuit; but I may omit such battery and utilize this main current or a portion of the main current instead.

I claim—

1. The combination of an electric circuit containing a source of electrical energy and one or more translating devices and a cut-out associated with said circuit and adapted to be operated by the heat effect of the current so as to break the circuit after the current has been flowing for a predetermined length of time, and a compensating device associated with said cut out to obviate the effect of changes in the temperature of the surrounding atmosphere.

2. The combination of a circuit containing a generator, a translating device and a circuit closer, with a thermal responsive device associated with such circuit and responsive to excessively prolonged currents, and a circuit making or breaking device controlled by such responsive device, said responsive device insensible to changes in the temperature of the surrounding atmosphere.

3. The combination of a circuit containing a generator, a translating device and a circuit breaker with a thermal responsive device associated with such circuit and responsive to excessively prolonged currents, and a circuit making or breaking device controlled by such responsive device, such responsive device insensible to changes in the temperature of the surrounding air but sensitive to the heat effects of the current.

4. A circuit making and breaking device consisting of two mercury tubes with conductors leading thereto, a coil about one of said tubes, and a conductor supported at one end on a float in one tube, its other end in proximity to the mercury in the other tube.

5. A duplex thermostat having two contact members which are adapted to compensate reciprocally for changes in atmospheric temperature, whereby the contact members are held constantly in the same relative position for all changes in the temperature of the surrounding air.

6. In combination with an electric circuit, a thermal responsive device responding to changes of the current in said circuit, contact points adapted to be closed by said responsive device, and means adapted to be operated by changes in atmospheric temperature for adjusting said contact points to close upon a predetermined change of the strength of the current in said circuit, substantially as described.

Signed at Chicago, Illinois, September 21, A. D. 1894.

FRANCIS B. BADT.

In presence of—
 WALTER J. GUNTHORP,
 MINNIE TORBETT.